US005638723A

United States Patent [19]
Lin

[11] Patent Number: 5,638,723
[45] Date of Patent: Jun. 17, 1997

[54] MOTORCYCLE STEP

[76] Inventor: Frank Lin, 377, Sec. 1, Chang Mei Road, Changhua, Taiwan

[21] Appl. No.: 515,002

[22] Filed: Aug. 14, 1995

[51] Int. Cl.⁶ .............................. G05G 1/18; B62H 1/08
[52] U.S. Cl. .............................. 74/564; 280/291
[58] Field of Search .......................... 74/564; 280/291, 280/163

[56] References Cited

U.S. PATENT DOCUMENTS

| | | | |
|---|---|---|---|
| 4,041,798 | 8/1977 | Shinozaki et al. | 74/512 |
| 4,174,852 | 11/1979 | Panzica et al. | 74/564 X |
| 4,797,791 | 1/1989 | Burchick | 280/291 X |
| 5,354,086 | 10/1994 | Mueller | 280/291 |
| 5,454,580 | 10/1995 | Lin | 280/291 |
| 5,482,307 | 1/1996 | Lin | 280/291 |

FOREIGN PATENT DOCUMENTS

| | | | |
|---|---|---|---|
| 815001 | 9/1951 | Germany | 74/564 |
| 272719 | 6/1927 | United Kingdom | 74/564 |

*Primary Examiner*—Vinh T. Luong
*Attorney, Agent, or Firm*—Beveridge, DeGrandi, Weilacher & Young, LLP

[57] ABSTRACT

An improved motorcycle step and assembly of interlocking components including an axle for connection to the motorcycle frame the axle featuring a tapered section for engaging an inner sleeve having a plurality of ribs formed along its outer surface, the inner sleeve being composed of a soft material and being locatable on the axle, an outer sleeve having a plurality of slots corresponding to the ribs which is adapted to slide over the inner sleeve and receive the ribs and a locating element formed on the end of the outer sleeve to receive a projection from the axle where the outer sleeve has an optional decorative cover plate.

1 Claim, 5 Drawing Sheets

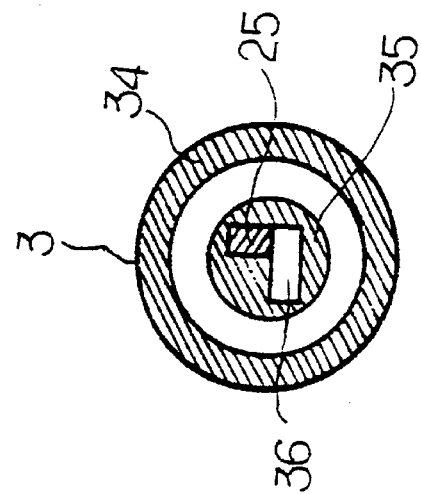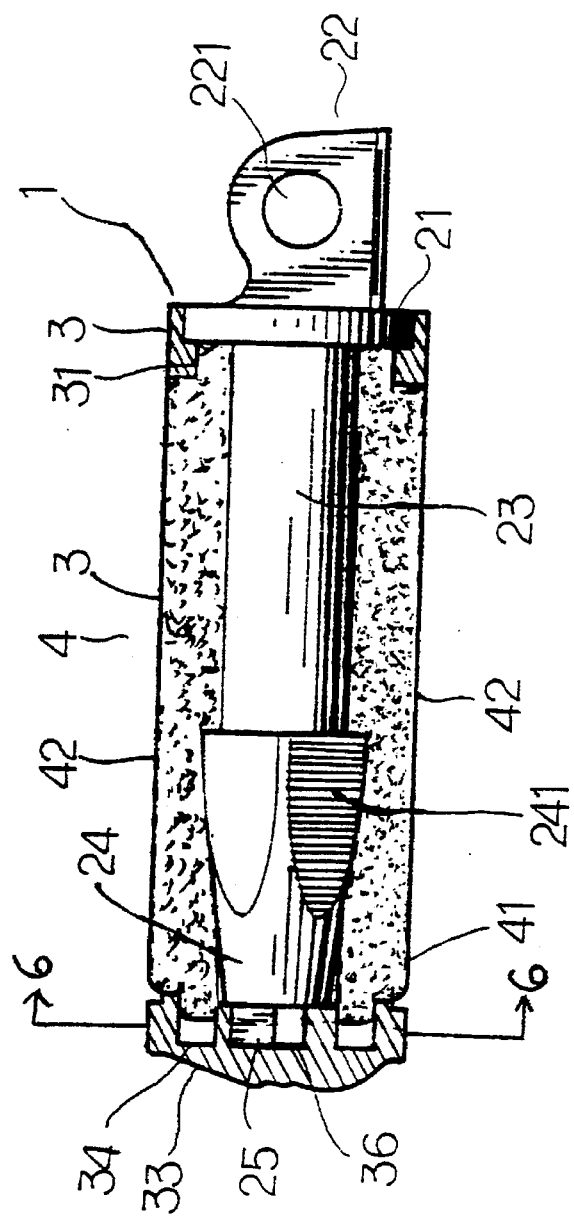

MOTORCYCLE STEP

FIELD OF INVENTION

This invention relates to improvements in foot supports for vehicles and, more particularly, to an improved motorcycle step improving the safety of riding a motorcycle.

BACKGROUND AND DESCRIPTION OF THE PRIOR ART

Motorcycles are a convenient form of transportation particularly in urban areas subject to heavy traffic. While the motorcycle is in motion, the motorcycle rider typically rests his feet on the motorcycle steps. The construction of conventional motorcycle steps is illustrated in FIGS. 1 and 2. Motorcycle step A includes axle A1 incorporating at one end, includes threaded hole A14 and at the opposite end, a large pin header connection A11. The header A11 includes a concave portion A12 defined by two side skirt portions. A through hole A13 is drilled through the side skirt portions of A12 for receiving the pin to connect the step to the motorcycle.

The prior art motorcycle step features a soft, inner sleeve A2 which includes an inner through hole A21 and convex, rhombic ribs A22 formed on the outer surface thereof. The through hole A21 is adapted to receive the axle A1. The inner sleeve A2 is covered by a metal outer sleeve A3 which includes and installing hole A31 and terminal or stopping edge Aced incorporating a countersunk hole A33, and rhombic shaped slots A34 formed along its outer surface. The slots A34 correspond to the ribs A22 of the inner sleeve.

The prior art motorcycle step is assembled by sliding the inner sleeve A2 into the outer sleeve A3 so that the ribs A22 are aligned in the slots A34. The axle A1 is then inserted into the through hole A21 and a screw S is inserted through countersunk hole A33 and screwed into threaded hole A14 of axle A1.

The step A is attached to the motorcycle body using a pin through hole A13 firmed in the pin header connection A11 which permits the step to be foldable in respect to the motorcycle frame.

The prior art construction, described above, suffers from a problem caused by vibration. Motorcycle operation subjects the motorcycle step A to considerable dynamic and vibration forces. The forces may cause the screw S to loosen causing the step A to disassemble during riding resulting in a dangerous condition for the rider.

SUMMARY OF THE INVENTION

Thus, it is an object of the present invention to overcome the problems in the prior art and provide the advantages of an improved motorcycle step.

These and other objects are satisfied by a motorcycle step, comprising:

an axle, said axle having a flat section with a first end and a second end, said first end defining a stopping edge, said stopping edge having a hole drilled therein, said hole being orthoganal to said flat section providing a pin connection for connecting the axle to the motorcycle and said axle having a said second section defining a bar section including a four-sided, tapered section tapering toward said second end and a rectangular pillar extending from the tapered section to said second end of said axle;

an elongated outer sleeve, said outer sleeve having a first and second ends including an elongated installing hole formed along its axis and a plurality of strip shaped slots formed along its outer surface, said outer sleeve including a L-shaped slot formed on said second end thereof, said L-shaped slot dimensioned to receive said rectangular pillar of said axle;

an elongated inner sleeve having a through hole extending along the length of its axis of elongation, said inner sleeve including a plurality of equally spaced, convex, strip ribs corresponding to the strip shaped slots of said outer sleeve; and a cover plate disposed on the second end of said outer sleeve, said cover plate having an outer surface of selected geometry.

Given the following enabling description of the drawings and the inventive motorcycle step incorporating the improved construction, the scope of the invention should become evident to a person of ordinary skill in the art.

BRIEF DESCRIPTION OF THE DRAWINGS

FIG. 5 is a longitudinal cross-sectional view of the motorcycle step illustrated in FIG. 3.

FIG. 6 is a cross-sectional view of the cover plate assembly along line 6—6 of FIG. 5.

DESCRIPTION OF THE ILLUSTRATED EMBODIMENT

Figure 1:
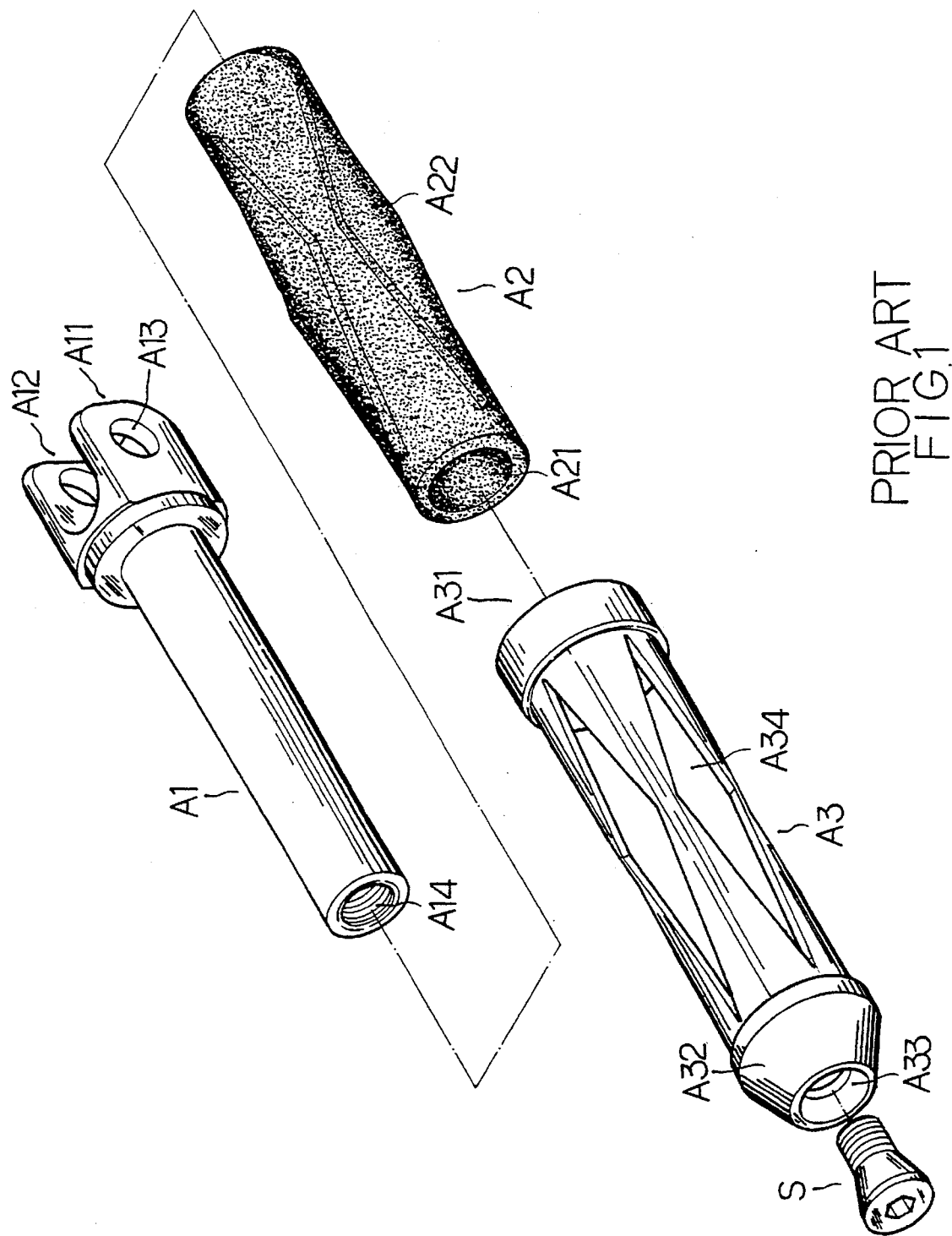
FIG. 1 is an assembly view of a Prior Art motorcycle step.
Figure 2:
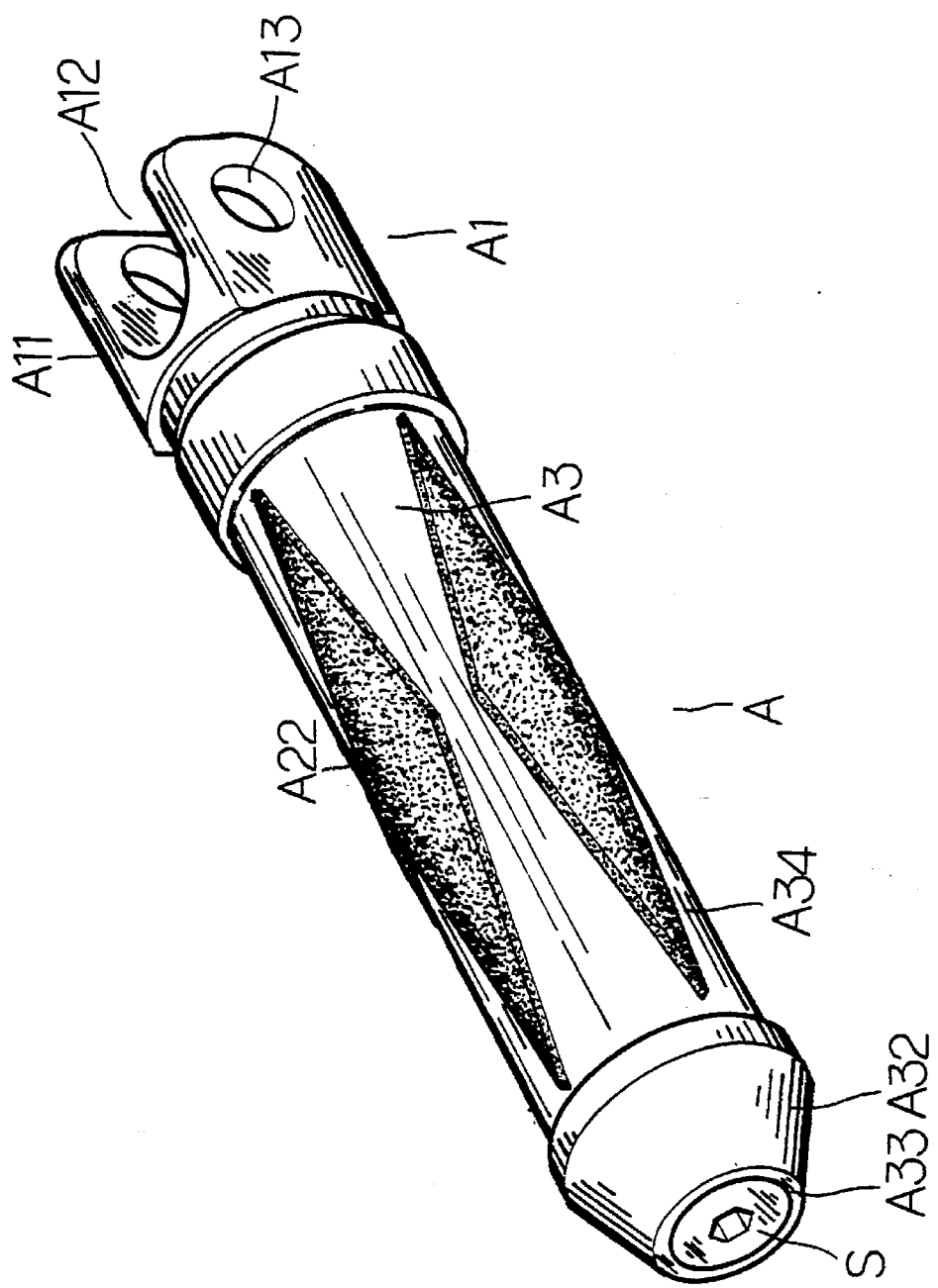
FIG. 2 is a perspective view of a Prior Art motorcycle step.
Figure 3:
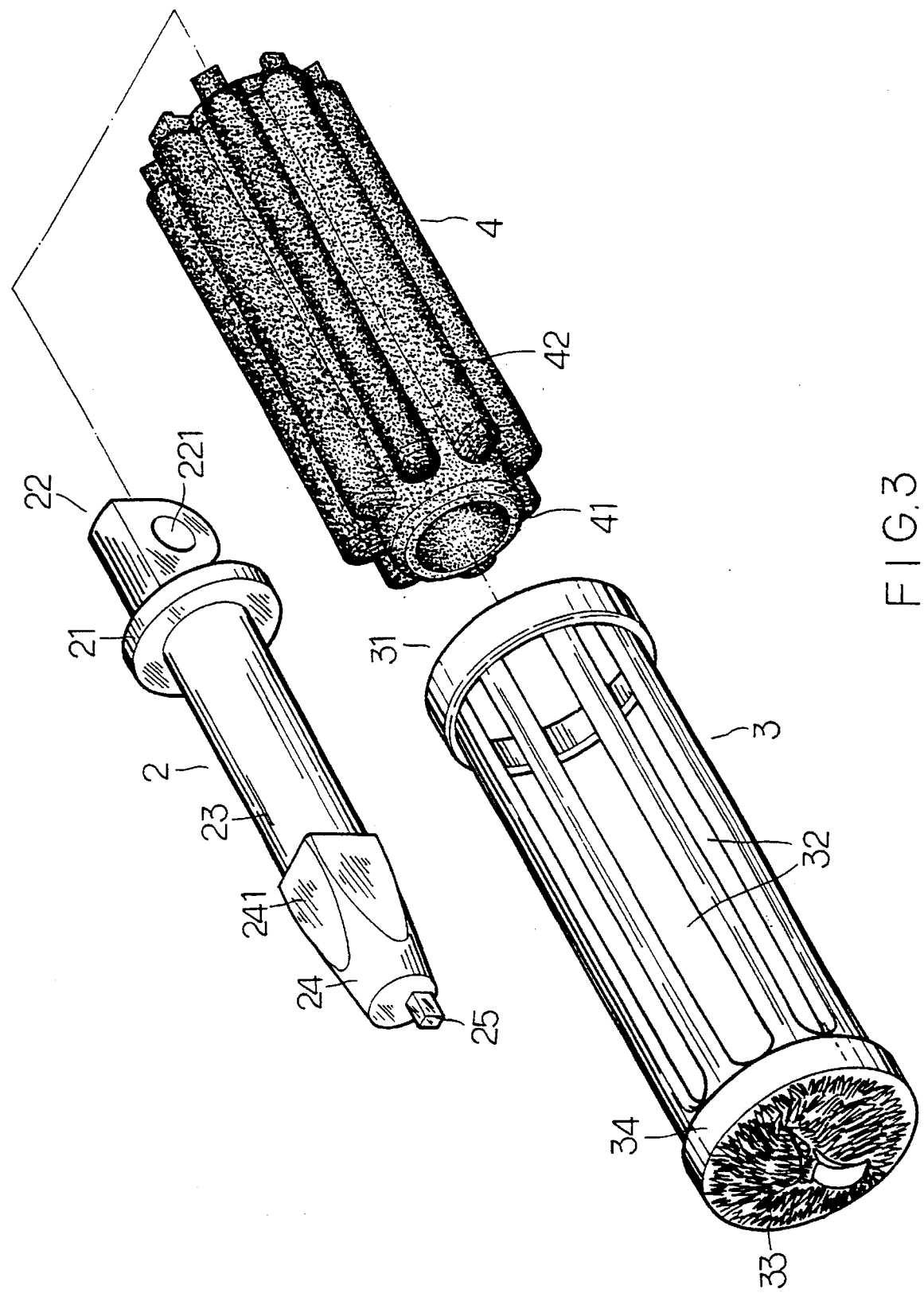
FIG. 3 is an assembly view of a motorcycle step according to the invention.
Figure 4:
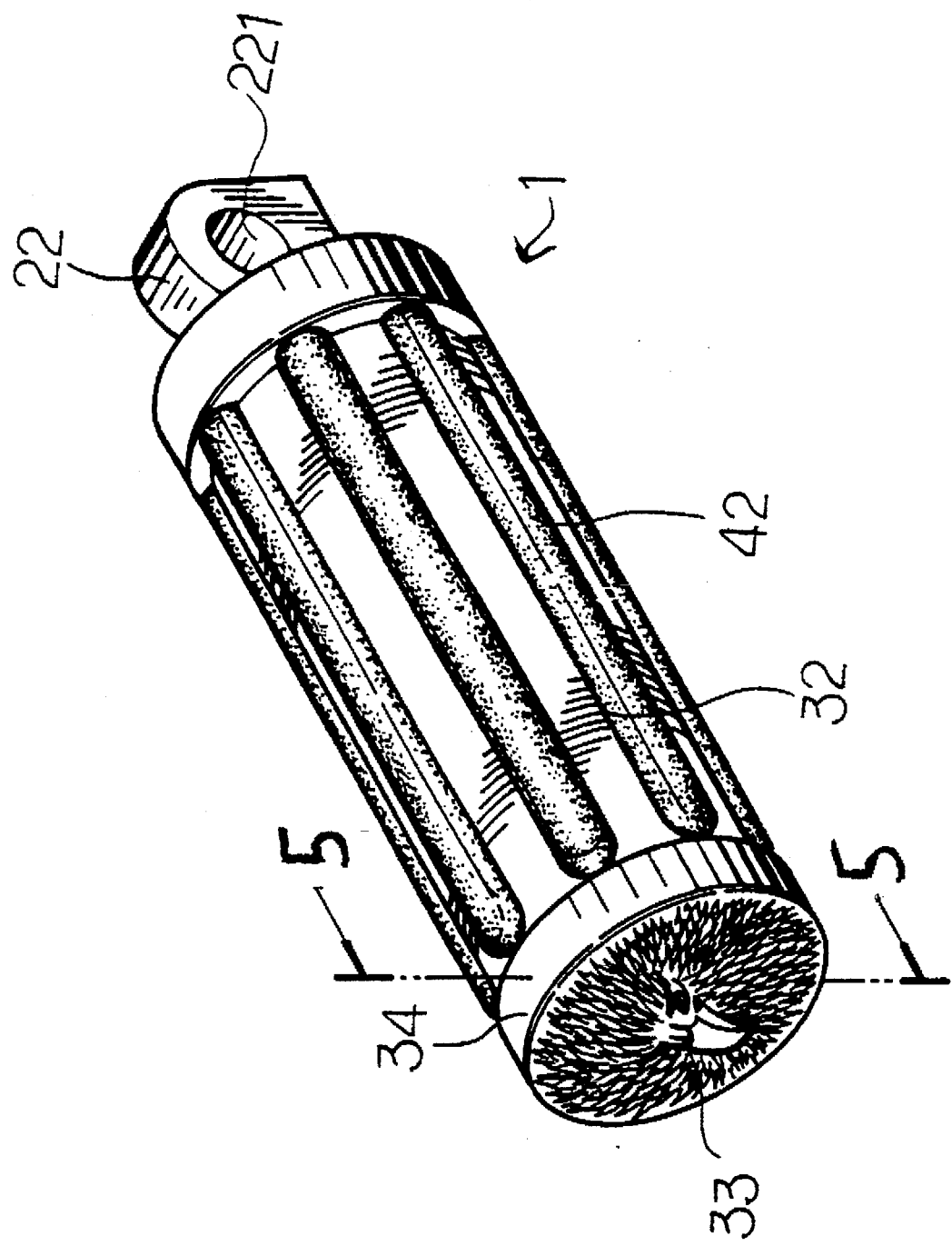
FIG. 4 is a perspective view of the motorcycle step illustrated in FIG. 3.

FIGS. 3 and 4 depict the inventive motorcycle step 1 of this invention for attachment to a motorcycle. The motorcycle step 1 comprises an axle 2, an outer sleeve 3, and an inner sleeve 4 made of a soft material. The axle 2, at one end provides a coupling to the motorcycle frame. That coupling is illustrated as flat section 22 which projects from stopping edge (shoulder) 21. The flat section 21 includes orthoganal through hole 221 adapted to receive a connecting pin to connect the axle 2 to the frame. The axle also defines a bar section 23 extending from the stop shoulder 21 and a tapered section 24 which tapers from the bar section 23 toward the end of the axle 2. The face of the tapered section 24 has four planes 241 orthogonally disposed relative to one another. The narrower end of tapered section 24 includes a face from which rectangular pillar 25 projects.

The outer sleeve 3 of the illustrated embodiment is formed from a rigid material such as metal and includes an installing hole (elongated bore) 31 and incorporates a plurality of spaced, strip shaped slots 32 formed in its outer surface. The outer sleeve 3 also includes a cover plate (end cap) 34, the exposed surface of which features a selected design 33. In FIG. 6, the end cap 34 is shown to include on its inwardly facing surface, a short column 35. That column 35 incorporates an L-shaped slot 36 which is adapted to receive the pillar 25 of the axle 2.

The inner sleeve 4 is formed of a suitable soft material and includes a through hole (axle receiving bore) 41 and a plurality of convex-shaped, equally spaced, ribs 42 formed on its outer surface which correspond to strip shaped slots 32. The ends of the ribs 42 are spaced from the ends of the inner sleeve.

The inventive motorcycle step of this invention is assembled from the foregoing components by sliding the inner sleeve 4 into the outer sleeve 3 and align the ribs 42 in the slots 32. Then axle 2 is squeezed into bore 41, requiring some compression of the inner sleeve in order to accommodate the passage of the tapered section 24, until the short pillar 25 fits into the L-shaped slot 36. Once so assembled separation of the axle from the inner sleeve or the inner sleeve from the outer sleeve is unlikely because of the compressed interlocking relation of the components.

Given the foregoing, variations and modifications to the invention should now be apparent to a person having ordinary skill in the art. These variations and modifications are intended to fall within the scope and spirit of the invention as defined by the following claims.

What is claimed is:

1. A motorcycle step, comprising:

an axle, said axle having a flat section with a first end and a second end, said first end defining a stopping edge, said stopping edge having a hole drilled therein, said hole being orthoganal to said flat section providing a pin connection for connecting the axle to a motorcycle and said axle having a said second section defining a bar section including a four-sided, tapered section tapering toward said second end and a rectangular pillar extending from the tapered section to said second end of said axle;

an elongated outer sleeve, said outer sleeve having a first and second ends including an elongated installing hole formed along its axis and a plurality of strip shaped slots formed along its outer surface, said outer sleeve including a L-shaped slot formed on said second end thereof, said L-shaped slot dimensioned to receive said rectangular pillar of said axle;

an elongated inner sleeve having a through hole extending along the length of its axis of elongation, said inner sleeve including a plurality of equally spaced, convex, strip ribs corresponding to the strip shaped slots of said outer sleeve; and a cover plate disposed on the second end of said outer sleeve, said cover plate having an outer surface of selected geometry.

* * * * *